July 22, 1924.  
A. L. STEWART  
1,502,279  
CORN TURNER ATTACHMENT FOR GRAIN DRILLS  
Filed Nov. 1, 1921
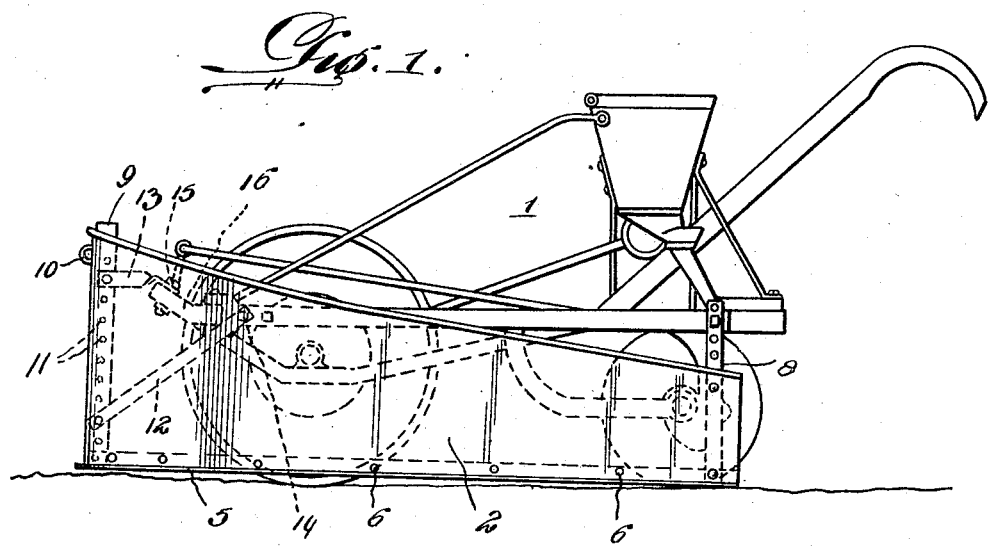

Patented July 22, 1924.

1,502,279

UNITED STATES PATENT OFFICE.

ALONZO L. STEWART, OF RUSHVILLE, INDIANA.

CORN-TURNER ATTACHMENT FOR GRAIN DRILLS.

Application filed November 1, 1921. Serial No. 512,126.

*To all whom it may concern:*

Be it known that I, ALONZO L. STEWART, a citizen of the United States, residing at Rushville, in the county of Rush and State of Indiana, have invented new and useful Improvements in Corn-Turner Attachments for Grain Drills, of which the following is a specification.

In the fall of the year wheat, rye and other grain is sown through the medium of grain drills, and turners have been applied to the drills with a view to turning the corn out of the way so that the discs and hoes of the drill will not cut the corn, and with a view at the same time of pushing pumpkins as well as ears of corn out of the way of the drill.

The object of my present invention is the provision of a turner for the purpose described, characterized by its capacity to be expeditiously and easily attached to drills of different makes, and this in such manner that the forward end of the turner is carried slightly above the surface of the ground, and the rear portions of the turner are made to serve as runners on the ground to maintain the shoes of the drill at a uniform distance below the surface of the ground.

To the attainment of the foregoing, the invention consists in the improvement as hereinafter described and definitely claimed.

In the accompanying drawings, forming part of this specification:—

Figure 1 is a side elevation showing my novel turner as properly applied to a grain drill.

Figure 2 is a top plan view of the turner per se.

Figure 3 is a longitudinal vertical section of the turner taken in a plane at the left of the standard of the turner.

Similar numerals of reference designate corresponding parts in all of the views of the drawings.

The drill 1 is shown by way of example, and may therefore be of any construction without affecting my invention.

My invention resides in the turner per se, and by comparison of Figures 1, 2 and 3 the turner will be understood as comprising a body 2, made of sheet metal or other appropriate material, in the configuration illustrated in Figure 2—i. e., of U-shape in plan with the bight 3 of the loop foremost and the sides 4 of the loop directed rearwardly so as to trail at opposite sides of a drill 1 after the manner shown in Figure 1. The body 2, preferably of sheet metal, is jointed at its lower end to a runner 5, of angle iron, the said runner 5 being riveted to the body 2 as designated by 6. In order to increase its strength and stiffness, the body 2 is provided at its upper edge with a barrel 7.

In addition to the body 2 characterized as described the turner comprises rear hangers 8, and a forward standard 9. The said hangers 8 are fixedly connected to the rear portions of the turner sides 4 and are extended above said sides and are provided with sets of transverse apertures so that the sides 4 may be expeditiously and easily connected to drills of different makes and in the manner conforming to my invention. The said standard 9 is appropriately fixed in and to the said bight 3 of the turner body, and it will be noticed by particular reference to Figure 3 that the standard 9 is further connected to the bight 3 through the medium of an eye bolt 10 to which a draft animal or animals may be hitched to draw the turner and the drill 1 to which the turner is connected. For adjustment purposes the standard 9 is provided with a vertical set or series of transverse apertures 11, and by comparison of Figures 2, and 3 it will be noted that rearwardly divergent draw bars 12 are connected to the lower portion of the standard 9, and draw bars 13 are connected with the upper portion of the said standard 9; the draw bars 12 being connected at 14 to the sides of the drill frame, and the draw bars 13 being connected at 15 to the drill beam, designated by 16 in Figure 1.

In conformity with my invention the forward portion of the turner body 2 is maintained slightly above the surface of the ground so as to lessen the draft, and the rear portions of the turner sides 4 are made to travel after the manner of runners on the surface of the ground, this in order to gauge the depth at which the shoes, shovels and discs or grain spouts of the drill move.

While I have shown and described particular draw bars 12 and 13 for effecting connection of the standard 9 to the forward portion of a drill frame, it is to be understood that draw bars of any appropriate character may be combined with the standard 9 according to the character of drill to which the turner is to be connected.

When desired the eye bolt 10 and its nut 20 may be depended upon to effect connection of the standard 9 to the bight of the turner.

I have entered into a detail description of the construction and relative arrangement of the parts embraced in the present and preferred embodiment of my invention in order to impart a full, clear and exact understanding of the said embodiment. I do not desire, however, to be understood as confining myself to the said specific construction and relative arrangement of parts inasmuch as in the future practice of the invention various changes and modifications may be made such as fall within the scope of my invention as defined in my appended claim.

Having described my invention, what I claim and desire to secure by Letters Patent, is:—

A corn turner attachment for drills including a U-shaped body formed of sheet material, the free ends of which are directed rearwardly at opposite sides of the drill, a bracket mounted on each free end of the body and adapted for adjustable connection to a portion of a drill, a vertical standard mounted on the forward inner side of the body, upper draw bars adjustably mounted on the upper end portion of the standard and extending rearwardly in a substantially horizontal plane for attachment to the drill, and lower draw bars adjustably mounted at the lower end of the standard and extending upwardly and rearwardly in inclined relation for attachment to the drill, whereby tortional strains on the U-shaped body are distributed through the upper and lower draw bars and the brackets to the drill, the draw bars and brackets cooperating in this distribution of stress, for preventing distortion of the body.

In testimony whereof, I affix my signature.

ALONZO L. STEWART.